(12) United States Patent
Tsirkin et al.

(10) Patent No.: US 12,333,322 B2
(45) Date of Patent: Jun. 17, 2025

(54) VIRTUAL NETWORKING FOR SPECIAL TYPES OF NESTED VIRTUAL MACHINES

(71) Applicant: Red Hat, Inc., Raleigh, NC (US)

(72) Inventors: Michael Tsirkin, Haifa (IL); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 469 days.

(21) Appl. No.: 17/704,651

(22) Filed: Mar. 25, 2022

(65) Prior Publication Data

US 2023/0305875 A1 Sep. 28, 2023

(51) Int. Cl.
*G06F 9/455* (2018.01)
*H04L 47/62* (2022.01)

(52) U.S. Cl.
CPC .......... *G06F 9/45558* (2013.01); *H04L 47/62* (2013.01); *G06F 2009/45562* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,463,980 B2 | 6/2013 | Post et al. | |
| 8,856,518 B2 | 10/2014 | Sridharan et al. | |
| 9,122,509 B2 | 9/2015 | Deng et al. | |
| 10,320,674 B2 | 6/2019 | Benny | |
| 10,536,340 B1* | 1/2020 | Manning | H04L 41/0895 |
| 2007/0250833 A1* | 10/2007 | Araujo | G06F 9/45558 718/1 |
| 2008/0163210 A1* | 7/2008 | Bowman | G06F 9/4843 718/1 |
| 2010/0131636 A1* | 5/2010 | Suri | H04L 47/125 709/224 |
| 2011/0004791 A1* | 1/2011 | Kokubu | G06F 11/0751 714/57 |
| 2011/0153909 A1 | 6/2011 | Dong | |
| 2013/0262801 A1* | 10/2013 | Sancheti | H04L 67/1097 711/162 |

(Continued)

OTHER PUBLICATIONS

"Run Hyper-V in a Virtual Machine with Nested Virtualization"; 7 pages; located at https://docs.microsoft.com/en-us/virtualization/hyper-v-on-windows/user-guide/nested-virtualization; Published Dec. 16, 2021.

(Continued)

*Primary Examiner* — Adam Lee
(74) *Attorney, Agent, or Firm* — Womble Bond Dickinson (US) LLP (57) ABSTRACT

Systems and methods for virtual machine networking can include creating, by a hypervisor running on a host computer system, a first virtual machine (VM) using a first set of computing resources, where the first set of computing resources includes a portion of a second set of computing resources allocated to a second VM managed by the hypervisor. They can further include assigning a first vNIC (virtual Network Interface Controller) to the first VM and setting up a second vNIC to receive data packets transmitted by the first vNIC. Additionally, they can include associating the second vNIC with an identifier of the first VM and assigning the second vNIC to the second VM.

20 Claims, 7 Drawing Sheets

(56) References Cited

U.S. PATENT DOCUMENTS

| | | | | |
|---|---|---|---|---|
| 2013/0308641 | A1* | 11/2013 | Ackley | G06F 9/45558 370/392 |
| 2014/0164621 | A1* | 6/2014 | Nakama | H04L 47/70 709/226 |
| 2014/0359620 | A1* | 12/2014 | Van Kerkwyk | G06F 9/45533 718/1 |
| 2015/0234671 | A1* | 8/2015 | Tomita | G06F 9/5016 718/1 |
| 2015/0309828 | A1* | 10/2015 | Shaik | G06F 9/5083 718/1 |
| 2016/0378528 | A1* | 12/2016 | Zamir | G06F 3/0679 711/162 |
| 2017/0102874 | A1* | 4/2017 | Ouchi | G06F 3/0631 |
| 2017/0255890 | A1* | 9/2017 | Palavalli | G06Q 10/06 |
| 2018/0314541 | A1* | 11/2018 | Khan | G06F 9/45558 |
| 2019/0227829 | A1* | 7/2019 | Schnee | G06F 9/5077 |
| 2021/0027909 | A1 | 1/2021 | Fukao et al. | |
| 2021/0117220 | A1* | 4/2021 | Zu | G06F 9/5077 |
| 2021/0226892 | A1* | 7/2021 | Fu | H04L 12/4641 |

OTHER PUBLICATIONS

"Set up a NAT network"; 10 pages; located at https://docs.microsoft.com/en-us/virtualization/hyper-v-on-windows/user-guide/setup-nat-network; Published Mar. 6, 2020.

Vmware Inc., "VMWare Networking Problem with Nested Virtualisation", 2 pages; located at https://communities.vmware.com/t5/VMWare-vCenter-Discussions/VMWare-networking-problem-with-nested-virtualisation/td-p/2277865; Published Mar. 19, 2015.

\* cited by examiner

VIRTUAL NETWORKING FOR SPECIAL TYPES OF NESTED VIRTUAL MACHINES

TECHNICAL FIELD

The disclosure is generally related to virtualization systems, and is more specifically related to virtual machine networking.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to mechanisms for managing networking within a virtualized environment.

Various processor architectures support virtualization by providing instructions for facilitating virtual machine execution. In certain implementations, a processor can support executing a hypervisor (also referred to as "virtual machine monitor") that can act as a host and have complete control of various hardware resources of a host machine including the processor. A hypervisor can present a virtual machine with an abstraction of one or more virtual processors as well as other virtual devices. A hypervisor can retain selective control of processor resources, physical memory, interrupt management, input/output (I/O), and networking. Each virtual machine (VM) is a guest software environment that can support a stack that includes operating system (OS) and application software. Each VM can operate independently of other VMs and can use the same interface to the processors, memory, storage, graphics, and I/O provided by the physical platform (i.e., host machine). The software executing in a virtual machine can be executed at the reduced privilege level so that the hypervisor can retain control of platform resources.

Communication between VMs or from a VM to an external network can be performed using virtual network interface controllers (vNICs) and virtual switches and/or network bridges. A vNIC is an abstraction layer for a network interface card, which allows a virtual machines communicate with other networked devices (e.g., using specific physical layer and data link layer standards). A virtual switch is an abstraction of a physical network switch, which is utilized for performing the data link layer frame routing and/or network layer packet routing between network nodes. In some implementations, vNICs can be connected to virtual ports of a virtual switch. A network bridge can perform forwarding of network layer packets between two separate network segments. Thus, a VM can use one or more vNICs, virtual switches, and/or bridges to connect to a physical network through the host physical network interface controller (NIC).

Nested virtualization refers to virtualization that runs inside an already virtualized environment. In nested virtualization, a hypervisor (hereafter "Level 0 hypervisor") controls physical hardware resources (e.g., bare metal). One or more first virtualized environments (hereafter "Level 1 VM") may run as virtual machine(s) managed by the Level 0 hypervisor. Each Level 1 VM may run its own set of VMs. These VMs can be referred to as Level 2 VMs. Each level indicates a ring of privilege and access to computing resources of a computer system, where Level 0 indicates the most privileged ring within an architecture of the computer system, and incremental levels indicate less privileged rings (e.g., Level 2 VM is less privileged that Level 1 VM). The Level 1 VM may control execution of the Level 2 VM(s).

Interrupts and exceptions are events that indicate that a condition exists in the system, the processor, or within the currently executing task that requires attention of a processor. The action taken by the processor in response to an interrupt or exception is referred to as handling the interrupt or exception. Interrupts occur at random times during the execution of a program, e.g., in response to signals from physical devices (e.g., requests to service peripheral devices). An interrupt may be addressed to any subset of processors within the system. In a computer system running one or more virtual machines, interrupts may be virtualized by the hypervisor identifying one or more virtual processors for servicing an outstanding interrupt and routing (or injecting) the interrupt message to the identified virtual processors (also referred to as virtual central processing units (vCPU)). Injectable interrupts include external interrupts, non-maskable interrupt (NMI), processor exceptions, software generated interrupts, system management interrupts, initialization interrupts, reset interrupts and software traps.

In nested virtualization, when an interrupt occurs at Level 0 hypervisor, Level 0 hypervisor injects the interrupt into Level 1 VM by sending the interrupt signal to a vCPU of the Level 1 VM requiring a virtual machine exit (VMExit) event from the receiving vCPU (e.g., the vCPU of Level 1 VM) and a virtual machine enter (VMEnter) event to the vCPU of Level 2 VM to inject the interrupt into each of the VMs of the Level 1 VM (e.g., Level 2 VMs). These processes use additional processing resources (e.g., central processing unit (CPU) resources) and hinders performance.

In some implementations, a Level 1 VM can request a Level 0 hypervisor to create another VM on behalf of the Level 1 VM and allocate a portion of the computing resources (e.g., memory and/or vCPUs) provided to the Level 1 VM to be used for the newly created VM. In these systems, the Level 1 VM can be referred to as a step-parent (SP) VM and the other VM created by the Level 0 hypervisor can be referred to as the step-child (SC) VM as it runs on a subset of the resources provided to the step-parent VM but is not fully nested within it (i.e., the SP VM may have incomplete access to resources allocated to the SC VM). However, while Level 2 VMs nested within Level 1 VMs can have their network traffic (i.e., receipt and transmission of data packets) be fully controlled by the Level 1 VM, in many cases a SP VM can often not have complete access to an SC VM's network traffic and the network traffic of the SC VM has to be managed (i.e., monitored/filtered) by the Level 0 hypervisor. Such an approach creates an additional drain on processing and memory resources and limit their availability for use in other VMs or other processes that can be executed on the host machine.

Aspects of the present disclosure address the above-noted and other deficiencies by providing mechanisms through which an SC VM can be executed on a subset of resources allocated to an SP VM and enable network traffic to be controlled by the SP VM. In particular, implementations of the present disclosure provide mechanisms that allow a hypervisor to execute a SC VM with a virtual network interface controller (vNIC) which utilizes a portion of resources allocated to an SP VM, thus allowing the SP VM to manage the networking operations of the SC VM. By providing access to the SP VM via one or more vNICs to the network traffic of the SC VM, the SP VM can monitor and/or modify the network traffic transmitted and/or received by the SC VM. In this manner, by using the computing resources (e.g., processing resources, memory resources) already dedicated to the SP VM, the traffic of the SC VM can be managed without additional resource drain on the hypervisor.

Various aspects of the above referenced methods and systems are described in details herein below by way of examples, rather than by way of limitation. The examples provided below discuss a virtualized computer system where managing nested containers may be initiated by aspects of a hypervisor, by a host operating system, by a virtual machine, or by a combination thereof. In other examples, managing VM network traffic may be performed in computer system that is absent a hypervisor or other virtualization features discussed below. These and other benefits of the implementations of the present disclosure can be understood in more detail with reference to FIG. 1.

Figure 1:
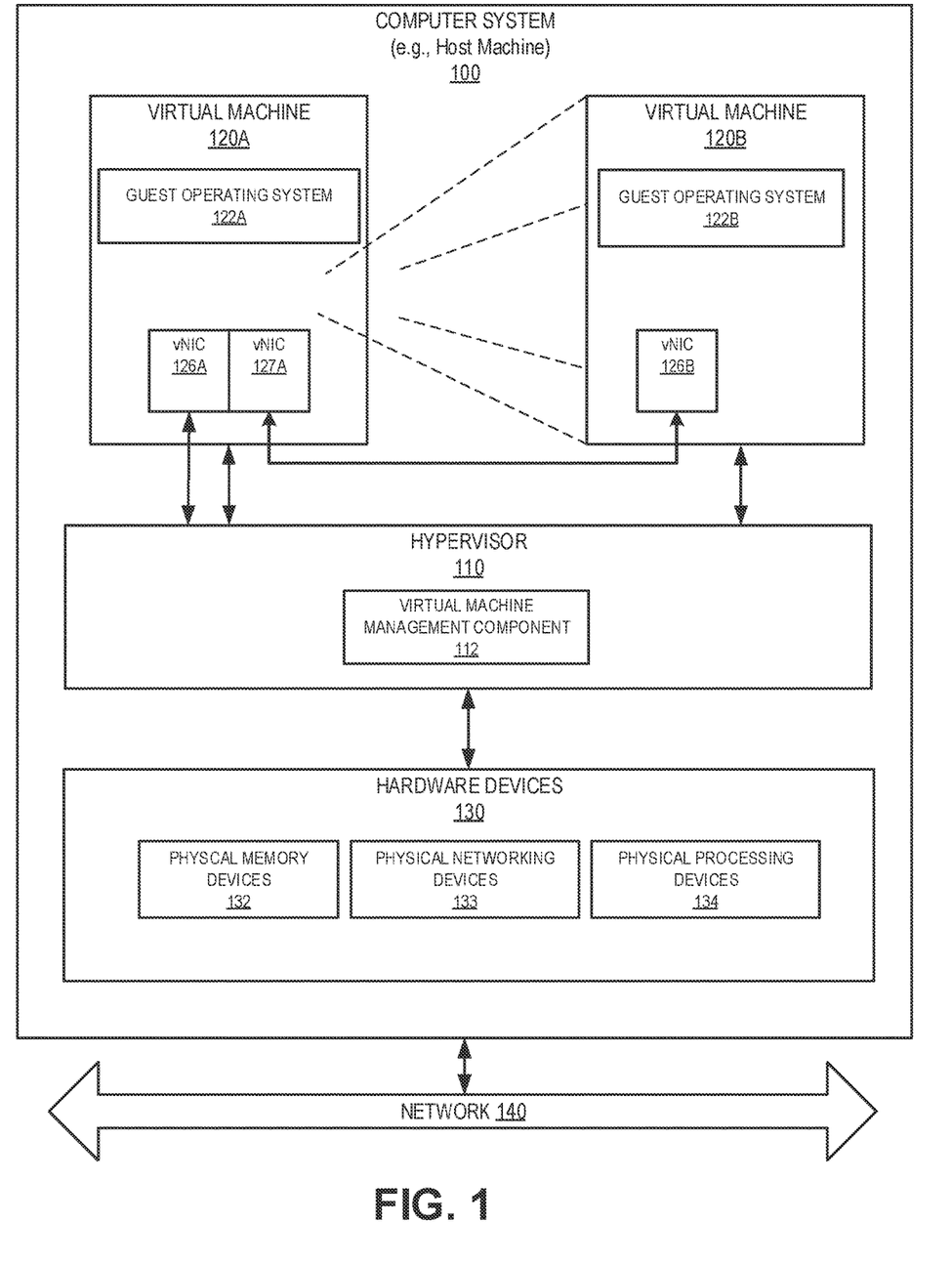
FIG. 1 depicts a high-level diagram of an example system architecture operating in accordance with one or more implementations of the present disclosure.

FIG. 1 depicts an illustrative architecture of elements of a computer system 100, in accordance with an implementation of the present disclosure. It should be noted that other architectures for computer system 100 are possible, and that the implementation of a computer system utilizing embodiments of the disclosure are not necessarily limited to the specific architecture depicted. Computer system 100 can be a single host machine or multiple host machines that may be arranged in a homogenous or non-homogenous group (e.g., cluster system, grid system, or distributed system). Computer system 100 can include a rackmount server, a workstation, a desktop computer, a notebook computer, a tablet computer, a mobile phone, a palm-sized computing device, a personal digital assistant (PDA), etc. In the implementation depicted in FIG. 1, computer system 100 can include hypervisor 110, virtual machines 120A-B, hardware devices 130, and network 140.

The computing device 100 can provide operating system level virtualization by running a computer program that provides computing resources to one or more VMs 120A-B, which can, in some implementations be deployed within respective containers. Operating system level virtualization can be implemented within the hypervisor 120 and can facilitate the isolation of VMs from one another. In one implementation, operating system level virtualization may not require hardware support and may impose little to no overhead because programs within each of the VMs may use the underlying hypervisor 110 to execute system calls. This may enable the computing device 100 to provide virtualization without the need to provide hardware emulation or be run in an intermediate virtual machine as may occur with hardware level virtualization. Operating system level virtualization may provide resource management features that isolate or limit the impact of one VM or another. For example, the hypervisor can manage and limit the access that a SP VM (e.g., VM 120A) running in one container has to the resources of another SC VM (e.g., VM 120B) running in another container using a portion of the resources dedicated to the SP VM.

The operating system level virtualization can provide a pool of computing resources that are accessible by VM 120A but are isolated from one or more other VMs. The pool of resources can include file system resources (e.g., particular volumes), network resources (e.g., particular network interfaces, sockets, addresses, or ports), memory resources (e.g., particular memory portions), other computing resources, or a combination thereof. The operating system level virtualization can also limit (e.g., isolate) a VM's access to one or more computing resources by monitoring the VM's activity and restricting the activity based on one or more predetermined limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Hypervisor 110 can include an operating system virtualizer that may provide containers VMs 120A-B with access to computing resources. The operating system virtualizer may wrap one or more processes (e.g., of a particular service) in a complete file system that contains the code, runtime, system tools, system libraries, and other data present on the node that can be used by the processes executing within the VM. The hypervisor 110 (e.g., via a VM management component 112) create VMs 120A-B and configure them with respective virtual network interface controllers (vNICs) 126A-B, 127A to enable them to transmit data (e.g., network data packets).

Each of the VMs 120A-B can refer to a resource-constrained execution environment implemented by computer system 100. Each of VMs 120A-B may appear to a user as a standalone instance of the user space of an operating system (not shown) of the computer system 100. Each of the VMs 120A-B can share the same kernel of a host operating system but may be constrained to use only a defined set of computing resources (e.g., CPU, memory, I/O).

VMs 120A-B can execute guest executable code that uses an underlying emulation of the physical resources. The guest executable code may include a guest operating system 122A-B, guest applications, guest device drivers, etc. Each of the VMs 120A-B can support hardware emulation, full virtualization, para-virtualization, operating system-level virtualization, or a combination thereof. VMs 120A-B can have the same or different types of guest operating systems. VMs 120A-B can execute guest operating systems 122A-B that manage vNICs 126A-B, 127A.

Each VM can be allocated guest memory (not shown) which can be any virtual memory, logical memory, physical memory, other portion of memory, or a combination thereof for storing, organizing, or accessing data. Guest memory can represent the portion of memory that is allocated by hypervisors 110 for use by one or more respective VMs 120A-B. Guest memory can be managed by guest operating system 122A-B. The hypervisor 110 can have hypervisor memory (not shown) allocated for hypervisor operations that can be the same or similar to the guest memory but can be managed by hypervisor 110 instead of a guest operating system. The memory allocated to VMs 120A-B can be a portion of hypervisor memory that has been allocated by hypervisor 120 to VMs 120A-B and can correspond to guest memory of VMs 120A-B. In some implementations a portion of the guest memory of VM 120A can be allocated to VM120B or one or more of its virtual devices (e.g., vNIC 126B). Other portions of hypervisor memory may be allocated for use by hypervisor 110, a host operating system, hardware device, other module, or a combination thereof.

Hypervisor 110 can also be known as a virtual machine monitor (VMM) and can provide VMs 120A-B with access to one or more features of the underlying hardware devices 130 including physical memory devices 132, physical networking devices 133, and physical processing devices 134. In the example shown, hypervisor 110 can run directly on the hardware of computer system 100 (e.g., bare metal hypervisor). In other examples, hypervisor 110 can run on or within a host operating system (not shown). Hypervisor 110 can manage system resources, including access to hardware devices 130, and may manage execution of VMs 120A-B on a host machine (e.g., computer system 100). This includes provisioning resources of a physical central processing unit ("CPU") to each VM 120A-B running on the host machine. Software executing in VMs 120A-B may operate with reduced privileges such that hypervisor 110 retains control over resources. In some implementations, hypervisor 110 can retain selective control of the processor resources, physical memory, interrupt management, networking, and input/output ("I/O"). In the example shown, hypervisor 110 can include a VM management component 112. The VM management component 112 may can create and manage VMs. The VM Management component 112 of hypervisor 110 can create a partially nested step-child (SC) VM 120B running on a portion of the resources allocated to a stepparent (SP) VM 120A to which the SP VM has limited access (e.g., by creating nested container in container and running the child virtual machine within the nested container). The VM management component 112 can refer to a software component implemented by one or more software modules, each module associated with a set of executable instructions. Furthermore, the VM management component 112 can be purely functional (i.e., VM management component 112 can be an integral part of the executable code of hypervisor 110).

VM management component 112 can create a SC VM 120B (e.g. an SC VM running in a nested container within another container where the SP VM is running) responsive to a request being sent to hypervisor 110 from the SP VM 120A. Further, the VM management component 112 can create and configure each VM 120A-B with one or more virtual network interface controllers (vNICs) 126A-B, 127A. Accordingly, SC VM 120B being executed on a portion of the resources allocated to a SP VN 120A imposes little to no overhead because programs and virtual devices within the SC VN can use computing resources (e.g., memory, processing) that have already been allocated by the underlying hypervisor 110 to execute system calls.

Hardware devices 130 can provide hardware resources and functionality for performing computing tasks. Hardware devices 130 can include one or more physical storage devices 132, one or more physical networking devices 133, one or more physical processing devices 134, other computing devices, or a combination thereof. One or more of hardware devices 130 can be split up into multiple separate devices or consolidated into one or more hardware devices. Some of the hardware device shown can be absent from hardware devices 130 and can instead be partially or completely emulated by executable code.

Physical memory devices 132 can include any data storage device that is capable of storing digital data and can include volatile or non-volatile data storage. Volatile data storage (e.g., non-persistent storage) can store data for any duration of time but can lose the data after a power cycle or loss of power. Non-volatile data storage (e.g., persistent storage) can store data for any duration of time and can retain the data beyond a power cycle or loss of power. In one implementation, physical memory devices 132 can be physical memory and can include volatile memory devices (e.g., random access memory (RAM)), non-volatile memory devices (e.g., flash memory, NVRAM), and/or other types of memory devices. In another example, physical memory devices 132 can include one or more mass storage devices, such as hard drives, solid state drives (SSD)), other data storage devices, or a combination thereof. In a further example, physical memory devices 132 can include a combination of one or more memory devices, one or more mass storage devices, other data storage devices, or a combination thereof, which can or may not be arranged in a cache hierarchy with multiple levels.

Physical processing devices 134 can include one or more processors that are capable of executing the computing tasks. Physical processing devices 134 can be a single core processor that is capable of executing one instruction at a time (e.g., single pipeline of instructions) or can be a multi-core processor that simultaneously executes multiple instructions. The instructions can encode arithmetic, logical, or I/O operations. In one example, physical processing devices 134 can be implemented as a single integrated circuit, two or more integrated circuits, or can be a component of a multi-chip module (e.g., in which individual microprocessor dies are included in a single integrated circuit package and hence share a single socket). A physical processing device can also be referred to as a central processing unit ("CPU").

Physical networking devices 133 (e.g., a network adapters or any other components that can connect a computer system to a computer network) can link the computer system 100 to network 140. Network 140 can be a public network (e.g., the internet), a private network (e.g., a local area network (LAN), a wide area network (WAN)), or a combination thereof. In one example, network 140 can include a wired or a wireless infrastructure, which can be provided by one or more wireless communications systems, such as a wireless fidelity (WiFi) hotspot connected with the network 140 and/or a wireless carrier system that can be implemented using various data processing equipment, communication towers, etc.

vNICs 126A-B, 127A can be virtual adapters configured to provide the VMs with a virtual interface which can communicate with other networked devices using specific physical layer and data link layer standards vNICs 126A-B, 127A can be connected to virtual ports of a virtual switch. The virtual switch may be connected to one or multiple physical networking devices 133 (e.g., network controller interface (NIC)), which can be used to create a bridge connection (via a network bridge) to a separate computer network. The network bridge can be a device that creates a connection between two separate computer networks and uses media access control (MAC) address information to make decisions regarding forwarding packets. A network bridge may interconnect two local area networks (LANs) together and/or separate network segments.

In some implementations, responsive to receiving a request from SP VM 120A to create an SC VM 120B, the hypervisor 112 can create an SC VM 120B. The SP VM 120A can also be created and managed by the hypervisor 112 and can be associated with a primary vNIC 126A. The association of a vNIC with a VM can involve including the vNIC buffer in the VM memory (e.g., by mapping its memory buffer(s) into the address space of the VM such that the memory buffer space used by the vNIC is included in the memory address space allocated to the VM by the hypervisor). In some implementations, the SP VM 120A can transmit an identifier of the SC VM 120B (e.g., a media access control address) to the hypervisor 120 so that the hypervisor can associate the identifier with the SC VM 120B. Thus, the hypervisor 120 can associate SC VM 120B with its own vNIC 126B. Accordingly, the SC VM 120B created by the hypervisor 112 upon request from SP VM 120A can be created using a portion of the computing resources (e.g., memory resources) allocated to the SP VM 120A such that the SC VM 120A has access to all or a portion of the resources allocated to the SC VM 120B.

Further, in some implementations the hypervisor 112 can create an auxiliary vNIC 127A in SP VM 120A by triggering a hot-add event (i.e., a virtualized/emulated addition of a new peripheral device without restarting the VM, e.g., by mapping its memory buffer(s) into the address space of the VM such that the memory buffer space used by the vNIC is included in the memory address space allocated to the VM by the hypervisor) that associates the auxiliary vNIC 127A with the SP VM 120A. Further, the auxiliary vNIC 127A can be associated with an identifier that can indicate that the auxiliary vNIC 127A is dedicated to communicating with SC VM 120B or is otherwise associated with the SC VM 120B. The auxiliary vNIC 127A can facilitate data packet transmission to and receipt from SC VM 120B.

In some implementations, when SC VM 120B transmits data packets through vNIC 126B it can be received by auxiliary vNIC 127A in SP VM 120A. Since the memory space allocated to the SC VM 120B along with that allocated to vNIC 126B is within the memory space allocated to SP VM 120A, this can be accomplished by allocating the same memory buffer space to a transmit queue of vNIC 126B as is allocated to the receive queue of the auxiliary vNIC 127A, as is described in more detail below. In some implementations the SC VM 120B can determine the memory space of the buffer of its vNIC 126B and notify the SP VM 120A so that the same memory space can be allocated to the auxiliary vNIC 127A of the SP VM120A. Once data packets are received at auxiliary vNIC 127A, they can be modified by the SP VM 120A and transmitted via the primary vNIC 126A, as described in more detail below.

In some implementations, to receive data packets, the SC VM 120B can obtain them from SP VM 120A. For example, SP VM 120A can receive data packets at its primary vNIC 126A and modify them. Then (e.g., when the packets are addressed to the SC VM 120B) the SP VM can load the packets from the buffer of the primary vNIC 126A and place them in the buffer (e.g., transmit queue portion of the buffer memory space) of the auxiliary vNIC 127A. Thus the packets can be received by the vNIC 126B of the SC VM 120B since the receive queue of the vNIC 126B cab, in some implementations, be the transmit queue of auxiliary vNIC 127A.

In some implementations, the hypervisor 112 can create an SC VM 120B using a portion of the computing resources allocated to the SP VM 120A. The SC VM 120B can be associated with a vNIC 126B which provides the SC VM 120B with virtual networking functionality. In the depicted example, SP VM 120A can be associated, by the hypervisor (e.g., via the virtual machine management component 112), with a primary vNIC126A and auxiliary vNIC 127A. The association of a vNIC with a VM can involve including the vNIC buffer in the VM memory (e.g., by mapping its memory buffer(s) into the address space of the VM such that the memory buffer space used by the vNIC is included in the memory address space allocated to the VM by the hypervisor) The primary vNIC 126A can transmit data packets to and receive data packets from the hypervisor 110 or the host machine 100 hardware devices 130 (e.g., physical networking devices 133). The vNIC 127A can be dedicated to transmitting data packets to and receiving data packets from vNIC 126B and can be referred to as the "auxiliary vNIC". Similarly, vNIC 126B can transmit data packets to and receive data packets from vNIC 127A.

When adding the auxiliary vNIC 127A to the SP MV 120A, the hypervisor can associate an identifier of the SC VM 120B with the auxiliary vNIC 127A that indicates that vNIC 127A is dedicated for the communication with SC MV 120B. For example, the hypervisor 110 can provide the identifier corresponding to the SC VM 120B and can associate it with auxiliary vNIC 127A. Accordingly, a record of vNICs and corresponding VMs with which they are dedicated to communicate can be stored in a data structure (e.g., table or associated metadata) by the hypervisor 110.

In some implementations, the hypervisor can create one or more VMs without vNICs and then trigger a hot-add event (i.e., a virtualized/emulated addition of a new peripheral device without restarting the VM, e.g., by mapping its memory buffer(s) into the address space of the VM such that the memory buffer space used by the vNIC is included in the memory address space allocated to the VM by the hypervisor) adding a vNIC to a VM (e.g., trigger a hot-add of auxiliary vNIC 127A to SP VM 120A. The auxiliary vNIC 127A can be associated with an identifier that matches it with the SC VM 120B with which it is dedicated to communicate.

When network data packets are to be transmitted by SC VM 120B, vNIC 126B can be used. For example, one or more packets can be transmitted from vNIC 126B to auxiliary vNIC 127A of SP VM 120A. At this point, in some implementations, the SP VM 120A can inspect and/or modify the network traffic being received from SC VM 120B (e.g., the SP VM 120A can modify the network data packets by adding headers to them, dropping one or more data packets, and delaying one or more data packets). The SP VM 120A can then transmit the modified network data packets to a network that is external to the SP VM 120A and SP VM 120B. In some implementations the SP VM 120A can transmit, using the primary vNIC 126A, network data packets (i.e., modified or unmodified after having been received from SC VM 120B) to the hypervisor 110. In other implementations. SP VM 120A can transmit, using the primary vNIC 126A, network data packets (i.e., modified or unmodified after having been received from SC VM 120B) to the host machine 100 hardware devices 130 (e.g., physical networking devices 133).

In some implementations, the hypervisor 110 (e.g., via VM machine management component 112) can assign a vNIC 126B to the SC VM 120B. The hypervisor 110 (e.g., via VM machine management component 112) can also set up auxiliary vNIC 127A to receive data packets transmitted by the vNIC 126B. In some implementations, the hypervisor 110 (e.g., via VM machine management component 112) can associate the auxiliary vNIC 127A with an identifier of the SC VM 120B and assign the auxiliary vNIC 127A to the SP VM 120A.

Thus, the SP VM 120A can receive via the auxiliary vNIC 127A, one or more data packets transmitted by the SC VM 120B via the vNIC 126B to a specified destination (e.g., to a destination outside of the VMs such as a machine on the same or on another network). In some implementations, the SP VM 120A can also inspect and/or modify the data packets and transmit them via the primary vNIC 126A to the specified destination.

Similarly, in some implementations, the SP VM 120A can receive one or more data packets via a primary vNIC 126A and then inspect and/or modify the data packets. In some implementations, the SP VM 120A can also transmit the data packets via the auxiliary vNIC 127A to the SC VM 120B.

To accomplish this, in some implementations, the hypervisor 110 (e.g., via VM machine management component 112) or SP VM 120A can map one network address in a the memory space associated with the SP VM 120A to another network address in the memory space associated with the SC VM 120B. In these implementations, one network address can reference a transmit queue associated with the vNIC 126B and the other network address can reference a receive queue associated with the auxiliary vNIC 127A. Similarly, in some implementations, the hypervisor 110 (e.g., via VM machine management component 112) or SP VM 120A can map a different network address in a the memory space associated with the SP VM 120A to yet another network address in the memory space associated with the SC VM 120B. In these implementations, one network address can reference a receive queue associated with the vNIC 126B and the other network address can reference a transmit queue associated with the auxiliary vNIC 127A.

In some implementations, the SP VM 120A can receive data packets through the primary vNIC 126A. In these implementations, in response to the SP VM 120A receiving, via a the primary vNIC 126A, a data packet addressed to the SC VM 120B, the SP VM 120A can store the data packet in a transmit queue associated with the auxiliary vNIC 127A, and enable the SC VM 120B to access the data packet via the receive queue associated with the vNIC 126B.

In some implementations SP VM 120A can directly or via the hypervisor 110 make a portion of the memory resources allocated to SP VM 120A accessible to vNIC 126B of SC VM 120B. This portion of memory resources can include the memory space where SC VM 120B stores packets for transmission. Because the SC VM 120B is being executed on a portion of the resources allocated to the SP VM 120A, the memory space SC VM 120B stores packets can be same memory space that is accessible to the primary vNIC 126A of the SP VM 120A (e.g., for use as a buffer). In some implementations, the packets of the SC VM 120B can be made (e.g., by SP VM120A or by hypervisor 110) accessible to the primary vNIC 126A since it can be given access to all of the memory resources allocated to SP VM 120A. In other implementations, only a portion of the memory resources allocated to a VM can be made accessible to a corresponding vNIC. For example, a portion of memory resources of SP VM 120A can be made (e.g., by SP VM 120A or the hypervisor 110) accessible to primary vNIC 126A and/or auxiliary vNIC 127A (this portion of the memory resources can be referred to the vNIC's "buffer"). Accordingly, in some implementations, the buffer of vNIC 126A and/or the buffer of auxiliary vNIC 127A can include the memory resource portion allocated to the SC VM 120B where the SC VM 120B can store data packets.

In some implementations, the SC VM 120B can receive data packets via vNIC 126B. For example, the SC VM 120B can (e.g., through the virtual machine management component 112 of hypervisor 110) provide the memory address of the portion of memory resources allocated to vNIC 126B (e.g., for storing packets) to the auxiliary vNIC 127A and make that portion of memory resources accessible by auxiliary vNIC 127A. For example, when memory resources are allocated to vNIC 126B, the memory address (e.g., or range of addresses) can be provided to the auxiliary vNIC 127A to associate the memory address of vNIC 126B with the identifier of the SC VM 120B that the auxiliary vNIC 127A has been associated with.

Thus, in some implementations, SP VM 120A can receive network data packets addressed to the SC VM 120B. These data packets can be received via the primary vNIC 126A from the hypervisor or from hardware devices 130 of computer system 100. The SP VM 120A can shape (i.e., modify) the network data packet traffic (e.g., by removing packet headers, verifying checksums, modifying checksums, etc.) received by the primary vNIC 126A. Regardless of whether the received data packets were modified or not, the SP VM 120A can load the packets from the buffer of the primary vNIC 126A and store it in the memory resource address previously given to the auxiliary vNIC 127A (i.e., the address where the packets of SC VM's 120B vNIC 126B are to be stored). In other implementations, the address of the memory resource allocated to vNIC 126B can be provided to the primary vNIC 126A and packets that it received can be loaded by SP VM 120A and stored in the address of the memory resource allocated to vNIC 126B for packet storage without using auxiliary vNIC 127A.

The aforementioned transmission and receipt of network data packets by the SC VM 120B can also be realized by co-locating the respective transmit and receive queues of the auxiliary vNIC 127A and vNIC 126B. For example, the transmit queue of vNIC 126B can be the receive queue of auxiliary vNIC 127A and/or the transmit queue of auxiliary vNIC 127A can be the receive queue of vNIC 126B. In some implementations, the transmit queue of vNIC 126B within the memory resource portion allocated to the SC VM 120B can be accessible to the SP VM 120A. Accordingly, the memory location of the receive queue of the auxiliary vNIC 127A can be determined by a pointer to the memory location of the transmit queue of vNIC 126B (i.e., as opposed to having separate dedicated memory resource areas [i.e., address ranges] for each respective queue of each vNIC). Similarly, the memory location of the receive queue of the vNIC 126B can be determined by a pointer to the memory location of the transmit queue of auxiliary vNIC 127A. Therefore, in some implementations, the receive queue of one vNIC can be in the same memory space as the transmit queue of the other vNIC. For example, SC VM 120B adding a packet to the transmit queue of vNIC 126B can automatically make the packet appear in the receive queue of the auxiliary vNIC 127A since the transmit queue of vNIC 126B is the receive queue of the auxiliary vNIC 127A. Analogously, SP VM 120A adding a packet to the transmit queue of the auxiliary vNIC 127A can automatically make the packet appear in the receive queue of vNIC 126B since the transmit queue of the auxiliary vNIC 127A is the receive queue of vNIC 126B. These and other features of the implementations of the present disclosure are described in more detail with reference to FIGS. 2 and 3.

Figure 2:
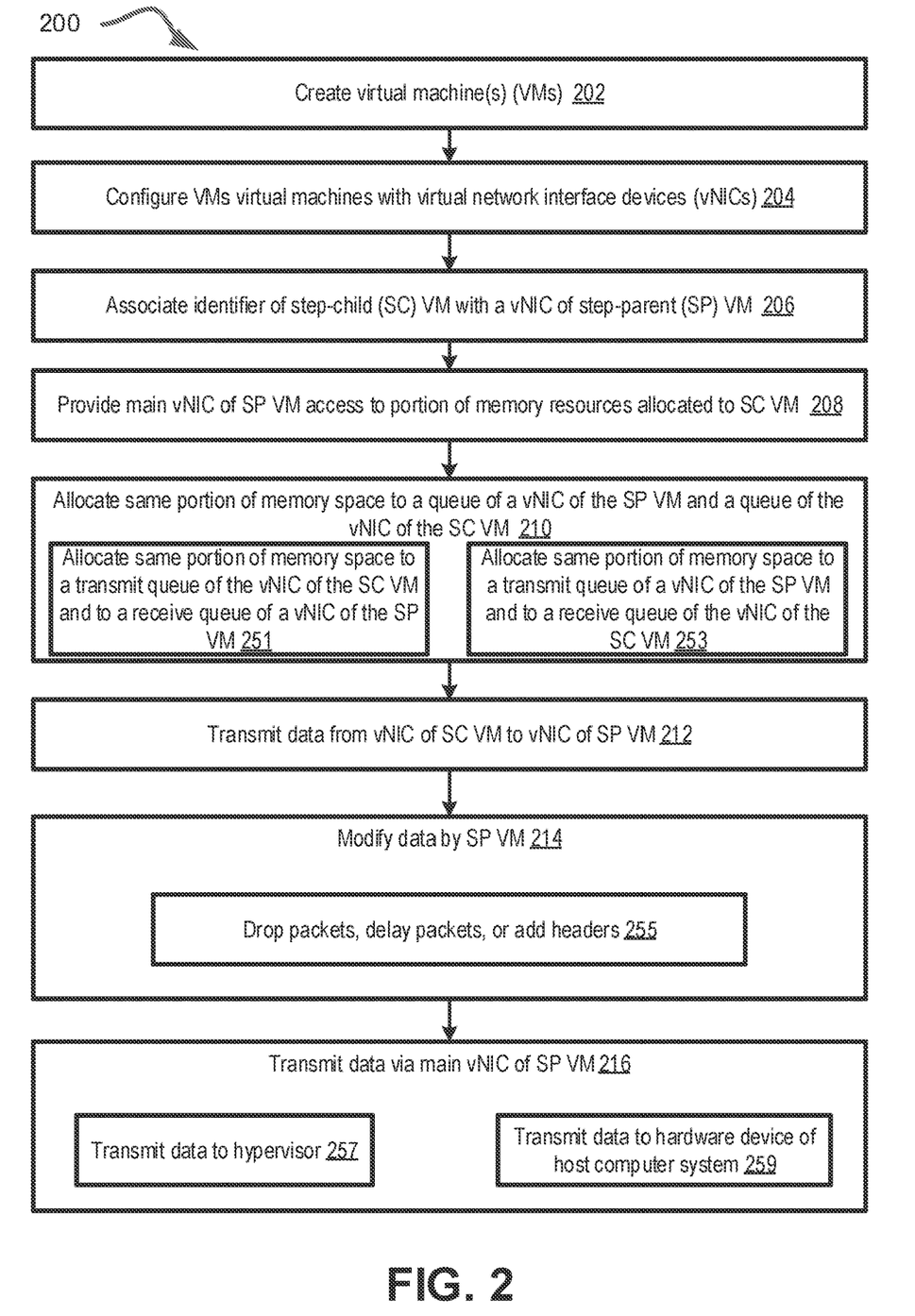
FIG. 2 is a flow diagram of an example method of virtual machine networking, in accordance with one or more implementations of the present disclosure.

FIG. 2 is a flow diagram of an example method of virtual machine networking, in accordance with one or more aspects of the present disclosure. Method 200 can be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations can be performed by one or more processors of a computer system (e.g., the computer system 100 of FIG. 1) implementing the method. In an illustrative example, method 200 may be performed by a single processing thread. Alternatively, method 200 can be performed by two or more processing threads, each thread implementing one or more individual functions, routines, subroutines, or operations of the method. In an illustrative example, the processing threads implementing method 200 can be synchronized (e.g., using semaphores, critical sections, or other thread synchronization mechanisms). Alternatively, the processing threads implementing method 200 can be executed asynchronously with respect to each other. Therefore, while FIG. 2 and the associated description lists the operations of method 200 in certain order, various implementations of the method can perform at least some of the described operations in parallel or in arbitrary selected orders.

In some implementations, at block 202, the processing logic can create one or more VMs to run on a host computer system. For example, the processing logic can create, by a hypervisor running on the host computer system, an SP VM and a SC VM. In some implementations it can create a SC VM using a subset (i.e., a portion) of a larger set of resources (e.g., processing and memory resources) allocated to SP VM. The processing logic can configure or add a primary vNIC to the SP VM, at block 204. Further, at block 204, the processing logic can configure the SP VM with another vNIC dedicated for communicating with the SC VM. For example, at block 204 the processing logic can assign a vNIC to the SC VM and can also set up an auxiliary vNIC in the SPVM to receive data packets transmitted by the vNIC of the SC VM.

Thus, at block 206, the processing logic can associate an identifier of the SC VM with the auxiliary vNIC of the SP VM. For example, at block 206, responsive to a request from the SP VM, the processing logic can associate, by the hypervisor, the identifier of the SC VM with the auxiliary vNIC of the SP VM. Thus, at block 206, the processing logic can associate the auxiliary vNIC with an identifier of the SC VM and assign the auxiliary vNIC to the SP VM. In this manner, a SP VM can be created with a primary vNIC and an auxiliary vNIC while a SC VM can be created with its own vNIC in communication with the auxiliary vNIC of the SP VM. At block 208, the processing logic can provide to the primary vNIC of the SP VM (e.g. using the hypervisor), access to a portion of the memory resources allocated to the SC VM where one or more data packets are stored (e.g., for transmission from the SC VM).

In some implementations, at block 210 the processing logic can (e.g., by the hypervisor), allocate the same portion of memory space to both a queue vNIC of the SP VM and a queue of the vNIC of the SC VM. For example, at block 251, the processing logic can allocate the same portion of memory space to both (i) the transmit queue of the vNIC of the SC VM and to (ii) the receive queue of the auxiliary vNIC of the SP VM such that the transmit queue of the vNIC of the SC VM corresponds to (i.e., is co-located with) the receive queue of the auxiliary vNIC of the SP VM. Analogously, at block 253, the processing logic can allocate the same portion of memory space to both (i) the transmit queue of the auxiliary vNIC of the SP VM and to (ii) the receive queue of the vNIC of the SC VM such that the transmit queue of the auxiliary vNIC of the SP VM corresponds to (i.e., is co-located with) the receive queue of the vNIC of the SC VM.

At block 212, the processing logic can transmit data from the vNIC of the SC VM to the auxiliary vNIC of the SP VM. For example, this can include transmitting one or more data packets from the vNIC of the SC VM to the auxiliary vNIC of the SP VM. Thus, the SP VM can receive via the auxiliary vNIC, one or more data packets transmitted by the SC VM via the vNIC 126B to a specified destination (e.g., to a destination outside of the VMs such as a machine on the same or on another network). In some implementations, the processing logic can cause the SP VM to also inspect and/or modify the data packets and transmit them via the primary vNIC to the specified destination. For example, at block 214, the processing logic can inspect and/or modify (e.g., via the SP VM) one or more data packets received from the SC VM. This modification can include, at block 255, for example, dropping one or more data packets, delaying one or more data packets, adding headers to the one or more data packets, or a combination of those operations. Further, in some implementations, at block 216, the processing logic can transmit (e.g., via the primary vNIC of the SP VM) one or more data packets (e.g., data packets received from the SC VM after modifying them or without modifying them). For example, transmitting, via the primary vNIC, one or more data packets can, at block 257, include transmitting the data packets to the hypervisor. In other implementations, at block 259, the processing logic can transmit (e.g., via the primary vNIC of the SP VM) the data packets to a hardware device of the host computer system.

Figure 3:
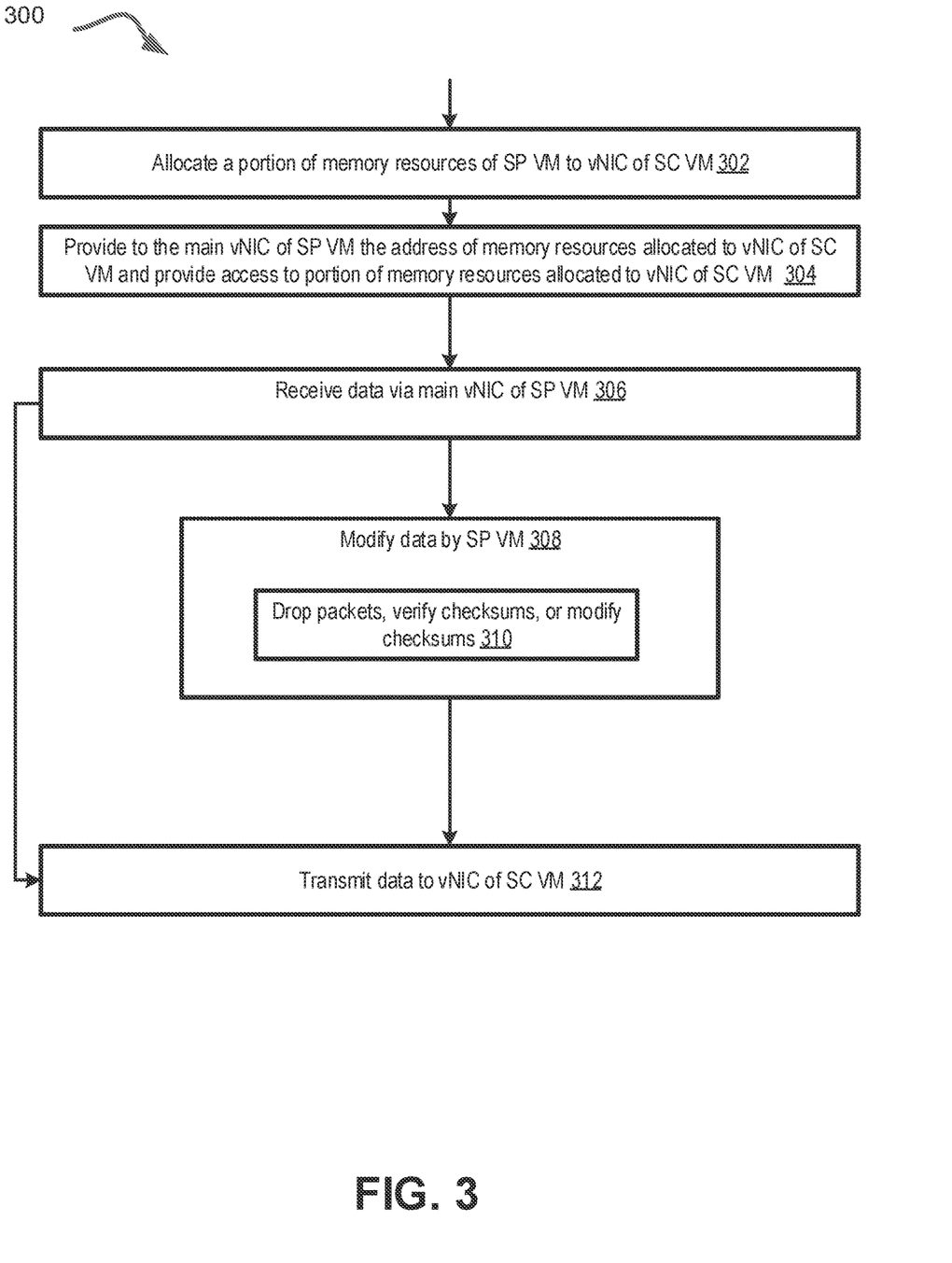
FIG. 3 is a flow diagram of an example method of virtual machine networking, in accordance with one or more implementations of the present disclosure.

FIG. 3 is a flow diagram flow diagram of an example method of virtual machine networking, in accordance with one or more aspects of the present disclosure. Method 300 can be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations can be performed by one or more processors of a computer system (e.g., the computer system 100 of FIG. 1) implementing the method. In an illustrative example, method 300 can be performed by a single processing thread. Alternatively, method 300B can be performed by two or more processing threads, each thread implementing one or more individual functions, routines, subroutines, or operations of the method. In an illustrative example, the processing threads implementing method 300 can be synchronized (e.g., using semaphores, critical sections, or other thread synchronization mechanisms). Alternatively, the processing threads implementing method 300 can be executed asynchronously with respect to each other. Therefore, while FIG. 3 and the associated description lists the operations of method 300 in certain order, various implementations of the method can perform at least some of the described operations in parallel or in arbitrary selected orders.

Events and operations occurring within the various blocks of method 300 can occur, in some implementations, in any order as well as together with or instead of events and operations occurring within the various blocks of method 200 described earlier. At block 302, the processing logic (e.g., via the hypervisor) can allocate a portion of the memory resources of the SP VM to the vNIC of the SC VM. At block 304, the processing logic can (e.g., by the hypervisor or the SP VM) provide, to the primary vNIC of the SP VM, the address (e.g. or address range within memory space) of the memory resources allocated to the vNIC to the SC VM. Further, at block 304, the processing logic can also provide, to a vNIC (e.g., primary vNIC or auxiliary vNIC) of the SP VM, access to the portion of memory resources allocated to the vNIC of the SC VM. In this manner, one or more vNICs of the SP VM can have access to the memory space in which the SC VM (e.g., via its vNIC) stores data packets. Thus at block, 304, the processing logic can map one network address in a the memory space associated with the SP VM to another network address in the memory space associated with the SC VM. In these implementations, one network address can reference a transmit queue associated with the vNIC and the other network address can reference a receive queue associated with the auxiliary vNIC. Similarly, in some implementations, the processing logic can map a different network address in a the memory space associated with the SP VM to yet another network address in the memory space associated with the SC VM. In these implementations, one network address can reference a receive queue associated with the vNIC and the other network address can reference a transmit queue associated with the auxiliary vNIC.

In some implementations, at block 306, the processing logic can (e.g., via the primary vNIC of SP VM) receive data. For example, the SP VM can receive data from an outside network (e.g., via a hardware device of the host machine) or from the hypervisor at the primary vNIC of the SP VM. Then, in some implementations, at block 308, the processing logic can (e.g., by the SP VM) modify the received data. For example, the SP VM can modify the networking data packets received by the primary vNIC of the SP VM from an external network via the hypervisor or via the hardware devices of the host computer system. In some implementations, modifying the data packets received by the primary vNIC, can include the processing logic removing data packet headers, verifying the checksums of the data packets, modifying the checksums of the data packets, or the combination of these operations at block 310. Thus in some implementations, the processing logic can cause the SP VM to receive one or more data packets via the primary vNIC and then inspect and/or modify the data packets.

In other implementations, the processing logic can forego modifying the data received by the primary vNIC of the SP VM. In these examples, at block 312, the processing logic can (e.g., via the SP VM) transmit the data received by the primary vNIC of the SP VM to the vNIC of the SC VM. In some instances this can be accomplished by relaying the data first to the auxiliary vNIC of the SP VM which, in turn, can relay it to the vNIC of the SC VM, or this can be accomplished by transmitting the data directly from the primary vNIC of the SP VM to the vNIC of the SC VM. Thus, the processing logic can, at block 312, cause the SP VM 120A to transmit the data packets via the auxiliary vNIC to the SC VM. In some implementations, at block 312, the processing logic can, in response to the SP VM receiving, via a the primary vNIC, a data packet addressed to the SC VM, can store the data packet in a transmit queue associated with the auxiliary vNIC, and enable the SC VM to access the data packet via the receive queue associated with the vNIC. These and other aspects including the details of the transmission and receipt of network data packets can be better understood with reference to FIG. 4A.

Figure 4A:
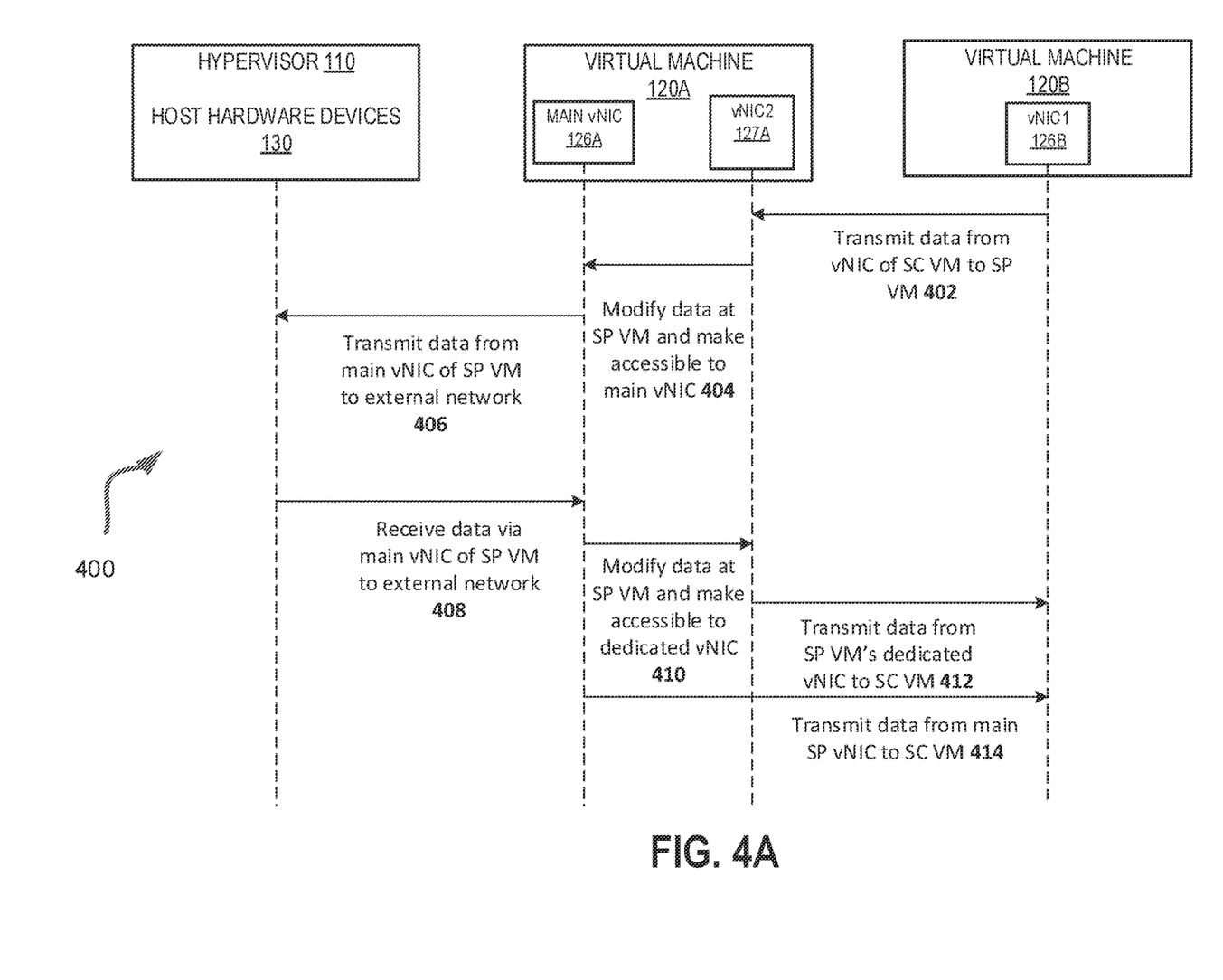
FIG. 4A depicts a diagram of a sequence of data transmissions, in accordance with one or more implementations of the present disclosure.

FIG. 4A a sequence 400 of data transmissions, in accordance with one or more implementations of the present disclosure. In some implementations, at operation 402 the vNIC 126B of SC VM 120B can transmit data (e.g., one or more network data packets) to the auxiliary vNIC 127A of SP VM 120A. As described earlier, this operation can be performed (e.g., via the hypervisor 110) by moving or copying the data packets from a memory space allocated to vNIC 126B to a memory space allocated to auxiliary vNIC 127A. In other implementations, both the transmit queue of vNIC 126B and the receive queue of the auxiliary vNIC 127 can have the same memory space allocated to them such that the placement, by SC VM 120B of a data packet in the transmit queue of the vNIC 126B automatically results in the appearance of the data packet in the receive queue of the auxiliary vNIC 127A.

Further, at operation 404, the SP VM 120A can modify the data received from the SC VM 120B and make the data accessible to the primary vNIC 126A. The modification of the data packets can include adding headers to one or more of the data packets, dropping one or more of the data packets, delaying one or more of the packets, or a combination of one or more of these operations. In some implementations, regardless of whether the data packets are modified or not, the network data packets received by the auxiliary vNIC 127A can be loaded from the buffer of the auxiliary vNIC 127A and placed in the buffer of vNIC 126A.

At operation 406, the SP VM 120A can transmit, by the primary vNIC 126A one or more network data packets to an external network via the hypervisor 110. In some implementations, the vNIC 126A can bypass the hypervisor and transmit the data packets to one or more of the host hardware devices 130 (e.g., to the physical networking devices 133).

Analogously, at operation 408, the SP VM can receive data (e.g., network data packets addressed to SC VM 120B) via the primary vNIC of the SP VM from an external network. The data can be received by the primary vNIC 126A either from hypervisor 110 or from one of the host hardware devices 130 (e.g., from one of the physical networking devices 133).

In some implementations, at operation 410, the SP VM 120A can modify the data received by the primary vNIC 126A and make the data accessible to the auxiliary vNIC 127A. The modification of the data packets can include removing data packet headers, verifying the checksums of the data packets, modifying the checksums of the data packets, or the combination of one or more of these operations. In some implementations, regardless of whether the data packets are modified or not, the network data packets received by the primary vNIC 126A can be loaded from the buffer of the primary vNIC 126A and placed in the buffer of the auxiliary vNIC 127A. Further, at operation 412, data (e.g., modified or unmodified network data packets) can be transmitted by the auxiliary vNIC 127A of the SP VM120A to the SC VM 120B. As described earlier, this operation can be performed (e.g., via the hypervisor 110) by moving or copying the data packets from a memory space allocated to the auxiliary vNIC 127A to a memory space allocated to the vNIC 126B. In other implementations, both the transmit queue of auxiliary vNIC 127A and the receive queue of the vNIC 126B can have the same memory space allocated to them such that the placement, by SP VM 120A of a data packet in the transmit queue of the auxiliary vNIC 127A automatically results in the appearance of the data packet in the receive queue of the vNIC 126B of the SC VM 120B.

Figure 4B:
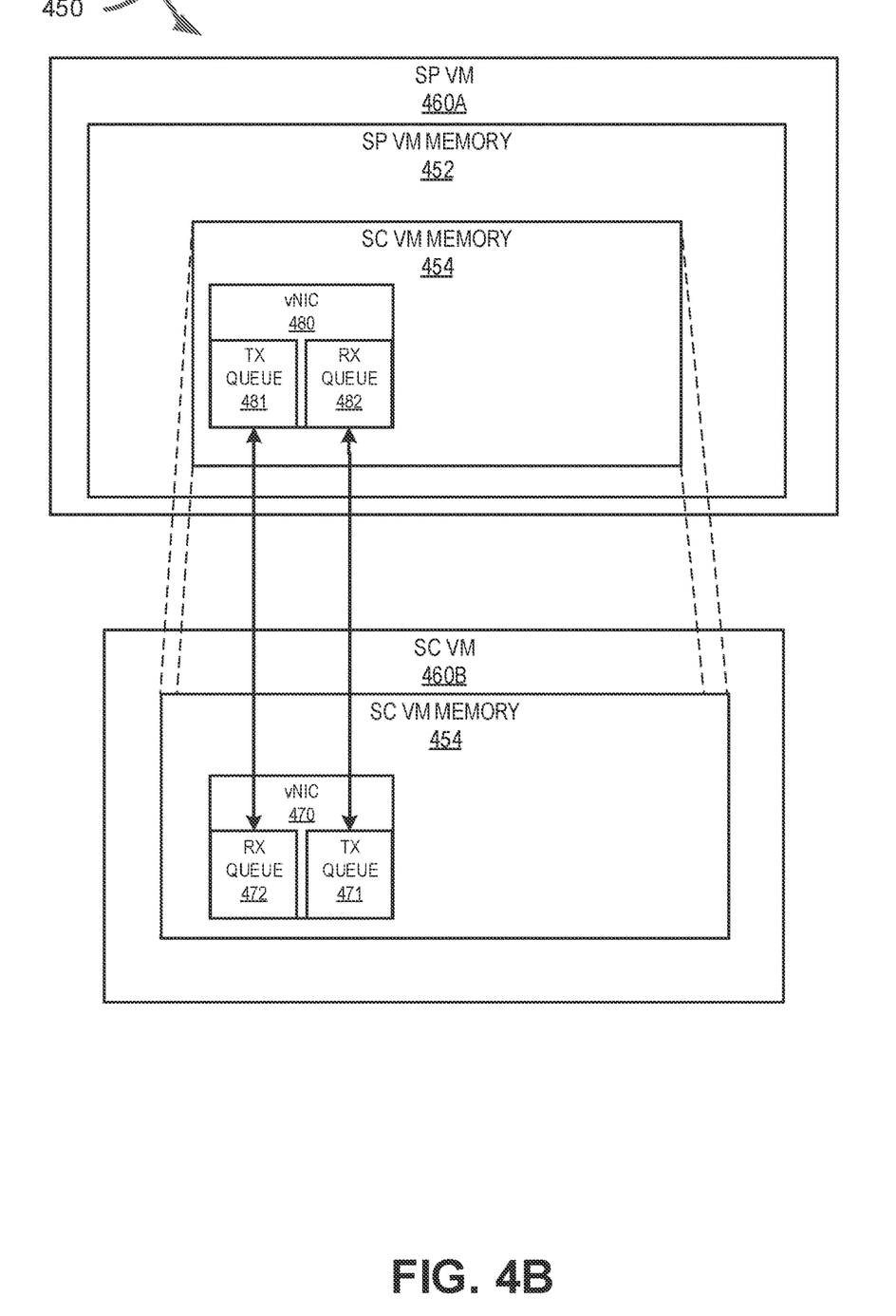
FIG. 4B depicts a block diagram of transmit and receive queue mapping in accordance with one or more implementations of the present disclosure.

FIG. 4B depicts a block diagram 450 of transmit and receive queue mapping in accordance with one or more implementations of the present disclosure. As noted earlier, in some implementations, the memory allocated to SP VM 260A can include a portion that is allocated to SC VM 460B. Accordingly, SC VM memory 454 can be included in SP VM memory 452.

In some implementations, auxiliary vNIC 480 can have memory space allocated to it that includes a transmit queue 481 and a receive queue 482 each of which have an associated memory space. Similarly, vNIC 470 can have memory space allocated to it that includes a transmit queue 471 and a receive queue 472 each of which have an associated memory space. Accordingly, in some implementations, a network address in the memory space associated with the SC VM 460 (i.e., SC VM Memory 454) can be mapped to another network address in the memory space associated with the SP VM (i.e., SP VM memory 252), where one network address references the transmit queue 471 of the vNIC 470 of SC VM 460B the other network address references the receive queue 482 of the auxiliary vNIC 480.

Analogously, in some implementations, a different network address in the memory space associated with the SC VM 460 (i.e., SC VM Memory 454) can also be mapped to another network address in the memory space associated with the SP VM (i.e., SP VM memory 252), where one network address references the receive queue 472 of the vNIC 470 of SC VM 460B the other network address references the transmit queue 481 of the auxiliary vNIC 480. In this manner, when a data packet is to be sent by SC VM 460B, the data packet can be placed in the transmit queue 471 of vNIC 470 and thereby, due to the mapping of the network addresses in the memory space, appear in the receive queue 482 of the auxiliary vNIC 480. Similarly, when a data packet is to be received by SC VM 460B (e.g. a data packet sent by SP VM 460A or sent from outside the VMs), the data packet can be placed in the transmit queue 481 of vNIC 480 and thereby, due to the mapping of the network addresses in the memory space, appear in the receive queue 472 of the auxiliary vNIC 470.

Figure 5:
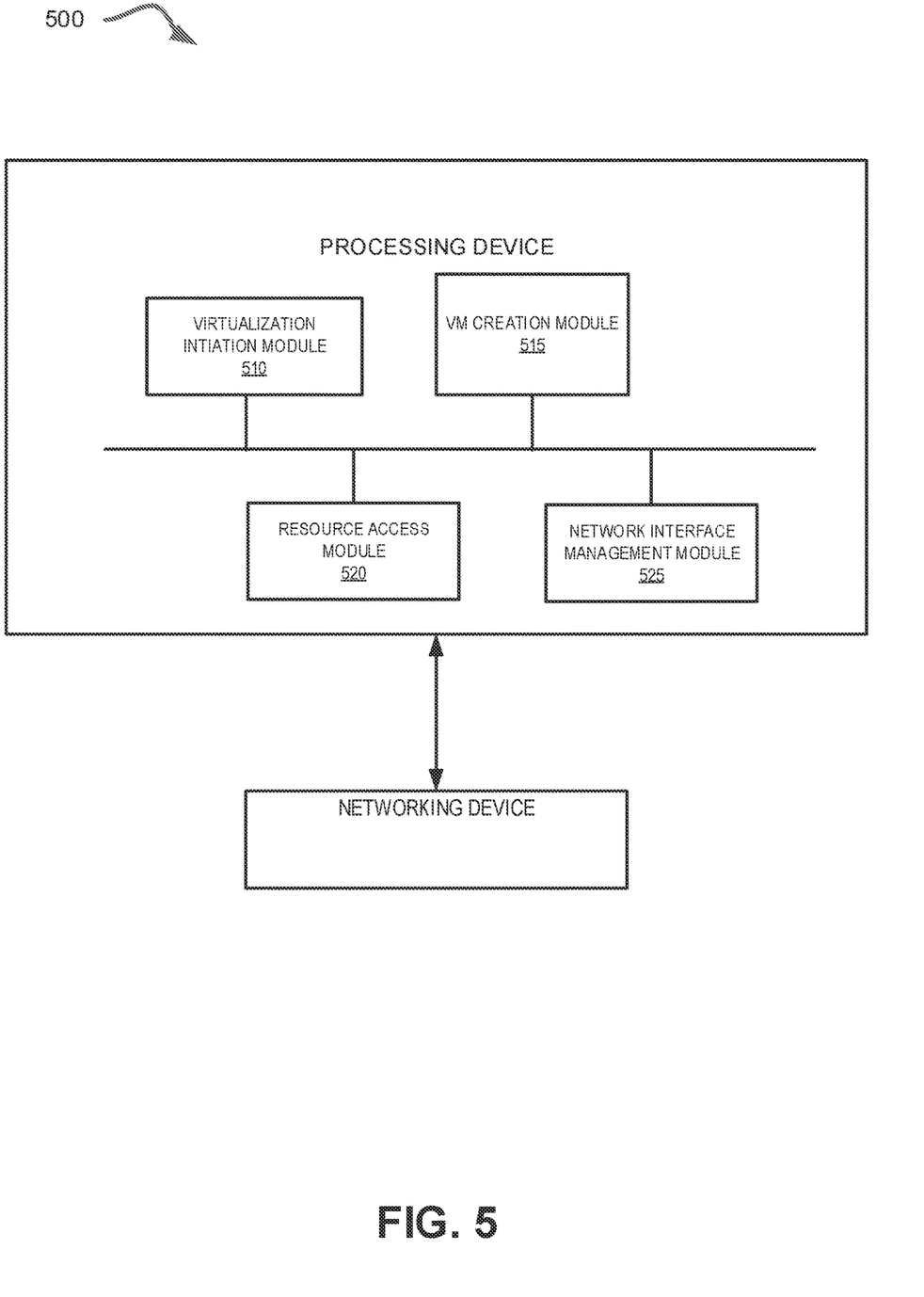
FIG. 5 depicts a block diagram of a computer system operating in accordance with one or more implementations of the present disclosure.

FIG. 5 depicts a block diagram of a computer system 500 operating in accordance with one or more aspects of the present disclosure. Computer system 500 can be the same or similar to computer system 100 of FIG. 1 or computer system 600 of FIG. 6 and can include one or more processing devices and one or more networking devices. In the example shown, computer system 500 may include a virtualization initiation module 510, a VM creation module 515, a resource access module 520, and a network interface management module 525.

In some implementations, the virtualization initiation module 510 can enable the processing device (e.g., a processor) to run a hypervisor to manage one or more virtual machines. The VM creation module 515 can enable the processor to create and manage one or more virtual machines and provision each of them with one or more guest software environments optionally including an operating system and application software. In some implementations, the VM creation module 515 can enable the processor to create and manage fully or partially nested VMs. For example, in response to a request by one virtual machine, the VM creation module 515 can enable the processor to create another virtual machine using a portion of the computing resources allocated to the first virtual machine.

Resource access module 520, can enable the processor to manage and provide access to computing resources (e.g., processing and memory resources) to the VMs and their constituent virtual devices (e.g., vNICs). In some implementations, resource access module 520 can enable the processor to determine and allocate memory resources to one or more vNICs of an SP VM and one or more vNICs of a SC VM, including regulating mutual access to the respective buffers of each of the vNICs. Further, the network interface management module 525 enable the processor to create and manage one or more vNICs in one or more respective VM. In some implementations, the network interface management module 525 can enable the processor to virtualize the networking resources of the networking device and manage the receipt and transmission of network data packets from and to each of the vNICs of the respective VMs.

Figure 6:
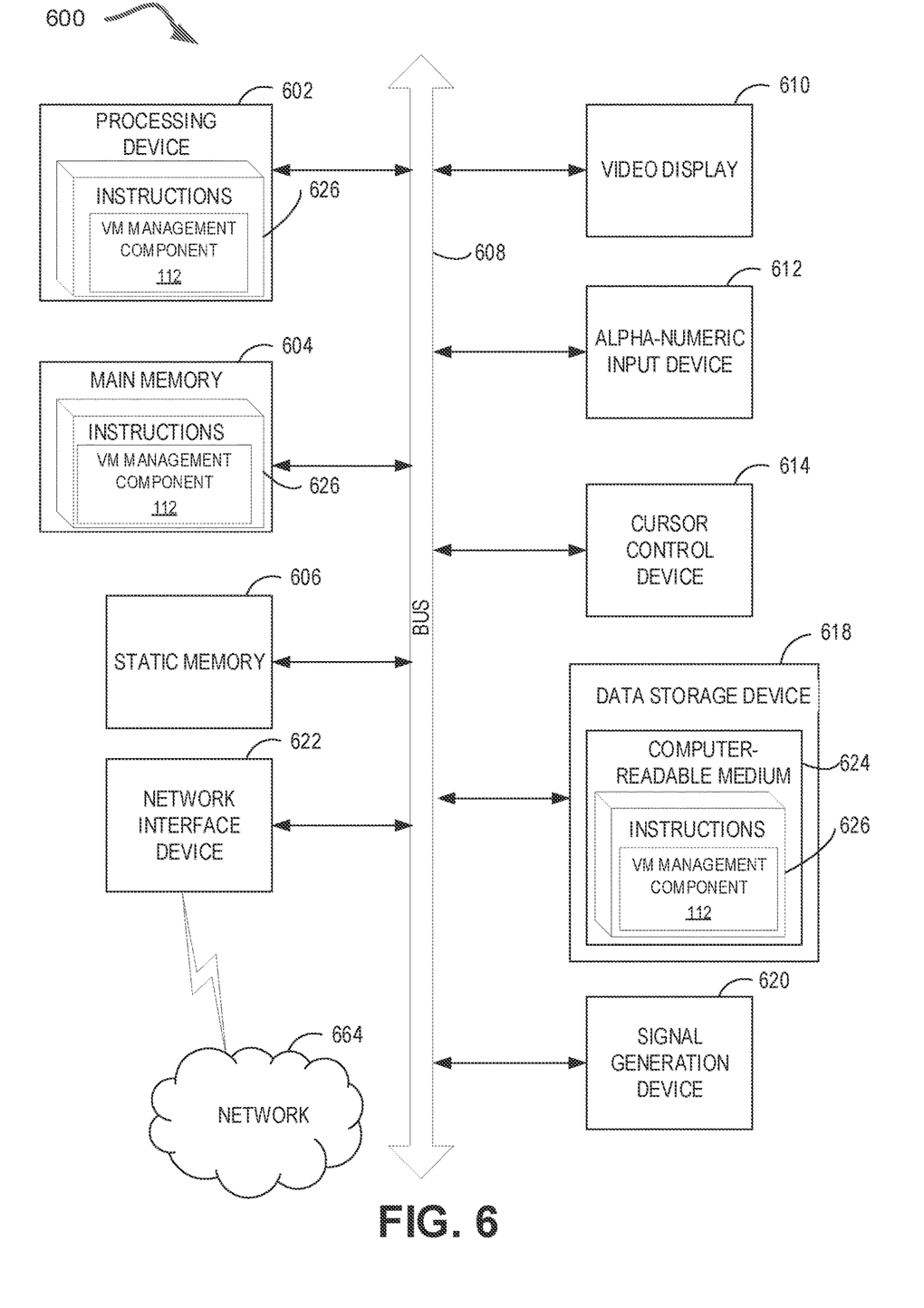
FIG. 6 depicts a block diagram of an illustrative computing device operating in accordance with one or more implementations of the present disclosure.

FIG. 6 depicts a block diagram of a computer system operating in accordance with one or more aspects of the disclosure. In various illustrative examples, computer system 600 can correspond to computer system 100 of FIG. 1. The computer system 600 can be included within a data center that supports virtualization. Virtualization within a data center results in a physical system being virtualized using VMs and/or containerized applications to consolidate the data center infrastructure and increase operational efficiencies. A VM can be a program-based emulation of computer hardware. For example, the VM can operate based on computer architecture and functions of computer hardware resources associated with hard disks or other such memory. The VM can emulate a physical computing environment, but requests for a hard disk, memory, or networking resources can be managed by a virtualization layer of a host system to translate these requests to the underlying physical computing hardware resources. This type of virtualization results in multiple VMs sharing physical resources.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peerto-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 can include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which can communicate with each other via a bus 608.

Processing device 602 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 can further include a network interface device 608. Computer system 600 also can include a video display unit 610 (e.g., an LCD), an alphanumeric input device 612 (e.g., a keyboard), a cursor control device 614 (e.g., a mouse), and a signal generation device 616.

Data storage device 618 can include a non-transitory computer-readable storage medium 624 on which can store instructions 626 embodying any one or more of the methodologies or functions described herein (e.g., VM management component 112 of FIG. 1, and methods 200 and 300 of FIGS. 2 and 3, respectively). Instructions 626 can also reside, completely or partially, within volatile memory 604 and/or within processing device 602 during execution thereof by computer system 600, hence, volatile memory 604 and processing device 602 can also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 200, and 300, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a hypervisor running on a host computer system, a request to create a first virtual machine (VM) on the host computer system, wherein the request is sent to the hypervisor by a second VM executing on the host computer system;
responsive to receiving the request, creating, by the hypervisor, the first virtual machine on the host computer system using a first set of computing resources of the host computer system, wherein the first set of computing resources comprises a portion of a second set of computing resources allocated to the second VM managed by the hypervisor;
executing, by the hypervisor, the first VM using the first set of computing resources, wherein the first VM has an assigned first vNIC (virtual Network Interface Controller);
configuring a second vNIC assigned to the second VM to control network traffic of the first vNIC, wherein the second vNIC is associated with an identifier of the first VM; and
controlling, by the second VM, the network traffic of the first VM.

2. The method of claim 1, wherein the controlling comprises:

receiving, by the second VM via the second vNIC, one or more data packets transmitted by the first VM via the first vNIC to a specified destination;

modifying, by the second VM, the one or more data packets; and transmitting, by the second VM, the modified one or more data packets via a third vNIC to the specified destination.

3. The method of claim 2, wherein the hypervisor comprises a VM management component.

4. The method of claim 1, wherein the controlling comprises:

receiving, by the second VM, one or more data packets via a third vNIC;

modifying, by the second VM, the one or more data packets; and transmitting, by the second VM, the modified one or more data packets via the second vNIC to the first VM.

5. The method of claim 1, wherein a first network address in a first memory space associated with the first VM is mapped to a second network address in a second memory space associated with the second VM, wherein the first network address references a transmit queue associated with the first vNIC, and wherein the second network address references a receive queue associated with the second vNIC.

6. The method of claim 1, wherein a first network address in a first memory space associated with the first VM is mapped to a second network address in a second memory space associated with the second VM, wherein the first network address references a receive queue associated with the first vNIC, and wherein the second network address references a transmit queue associated with the second vNIC.

7. The method of claim 1, further comprising:

responsive to receiving, via a third vNIC, a data packet addressed to the first VM, storing the data packet in a transmit queue associated with the second vNIC, and enabling the first VM to access the data packet via a receive queue associated with the first vNIC.

8. A system comprising:

a memory device; and a processing device operatively coupled to the memory device, the processing device to:

receive, by a hypervisor running on a host computer system, a request to create a first virtual machine (VM) on the host computer system, wherein the request is sent to the hypervisor by a second VM executing on the host computer system;

responsive to reception of the request, create, by the hypervisor, the first virtual machine on the host computer system using a first set of computing resources of the host computer system, wherein the first set of computing resources comprises a portion of a second set of computing resources allocated to the second VM managed by the hypervisor;

execute, by the hypervisor, the first VM using the first set of computing resources, wherein the first VM has an assigned first vNIC (virtual Network Interface Controller);

configure a second vNIC assigned to the second VM to control network traffic of the first vNIC, wherein the second vNIC is associated with an identifier of the first VM; and control, by the second VM, the network traffic of the first VM.

9. The system of claim 8, wherein to control the network traffic, the processing device is to:

receive, by the second VM via the second vNIC, one or more data packets transmitted by the first VM via the first vNIC to a specified destination;

modify, by the second VM, the one or more data packets; and transmit, by the second VM, the modified one or more data packets via a third vNIC to the specified destination.

10. The system of claim 9, wherein the hypervisor comprises a VM management component.

11. The system of claim 8, wherein to control the network traffic, the processing device is to:

receive, by the second VM, one or more data packets via a third vNIC;

modify, by the second VM, the one or more data packets; and transmit, by the second VM, the modified one or more data packets via the second vNIC to the first VM.

12. The system of claim 8, wherein a first network address in a first memory space associated with the first VM is mapped to a second network address in a second memory space associated with the second VM, wherein the first network address references a transmit queue associated with the first vNIC, and wherein the second network address references a receive queue associated with the second vNIC.

13. The system of claim 8, wherein a first network address in a first memory space associated with the first VM is mapped to a second network address in a second memory space associated with the second VM, wherein the first network address references a receive queue associated with the first vNIC, and wherein the second network address references a transmit queue associated with the second vNIC.

14. The system of claim 8, wherein the processing device is further to:

responsive to a reception, via a third vNIC, of a data packet addressed to the first VM, store the data packet in a transmit queue associated with the second vNIC, and enable the first VM to access the data packet via a receive queue associated with the first vNIC.

15. A non-transitory computer-readable media storing instructions that, when executed, cause a processing device to:

receive, by a hypervisor running on a host computer system, a request to create a first virtual machine (VM) on the host computer system, wherein the request is sent to the hypervisor by a second VM executing on the host computer system;

responsive to reception of the request, create, by the hypervisor, the first virtual machine on the host computer system using a first set of computing resources of the host computer system, wherein the first set of computing resources comprises a portion of a second set of computing resources allocated to the second VM managed by the hypervisor;

execute, by the hypervisor, the first VM using the first set of computing resources, wherein the first VM has an assigned first vNIC (virtual Network Interface Controller);

configure a second vNIC assigned to the second VM to control network traffic of the first vNIC, wherein the second vNIC is associated with an identifier of the first VM; and control, by the second VM, the network traffic of the first VM.

16. The non-transitory computer-readable media of claim 15, wherein to control the network traffic, the processing device is to:
    receive, via the second VM using the second vNIC, one or more data packets transmitted by the first VM via the first vNIC to a specified destination;
    modify, by the second VM, the one or more data packets; and
    transmit, by the second VM, the modified one or more data packets via a third vNIC to the specified destination.

17. The non-transitory computer-readable media of claim 16, wherein the
    hypervisor comprises a VM management component.

18. The non-transitory computer-readable media of claim 15, wherein to control the network traffic, the processing device is to:
    receive, by the second VM, one or more data packets via a third vNIC;
    modify, by the second VM, the one or more data packets; and
    transmit, by the second VM, the modified one or more data packets via the second vNIC to the first VM.

19. The non-transitory computer-readable media of claim 15, wherein a first network address in a first memory space associated with the first VM is mapped to a second network address in a second memory space associated with the second VM, wherein the first network address references a transmit queue associated with the first vNIC, and wherein the second network address references a receive queue associated with the second vNIC.

20. The non-transitory computer-readable media of claim 15, wherein a first network address in a first memory space associated with the first VM is mapped to a second network address in a second memory space associated with the second VM, wherein the first network address references a receive queue associated with the first vNIC, and wherein the second network address references a transmit queue associated with the second vNIC.

* * * * *